United States Patent [19]

Kanai et al.

[11] 4,364,885

[45] Dec. 21, 1982

[54] PROCESS FOR PRODUCING EASILY ADHERABLE POLYESTER FILM

[75] Inventors: Tamaki Kanai, Sagamihara; Takashi Yamagichi, Yokohama; Hirofumi Yoshikawa, Hachioji; Kenji Suzuki; Yoshikatsu Ohta, both of Sagamihara, all of Japan

[73] Assignee: Teijin Limited, Osaka, Japan

[21] Appl. No.: 272,524

[22] Filed: Jun. 11, 1981

[30] Foreign Application Priority Data

Jun. 16, 1980 [JP] Japan .................................. 55-80229

[51] Int. Cl.$^3$ ...................... B29D 9/00; B29C 17/02; B32B 27/18
[52] U.S. Cl. ............................ 264/134; 264/235.6; 264/235.8; 264/289.3; 264/289.6; 427/172; 427/173; 428/423.7; 428/484
[58] Field of Search ............... 264/134, 129, 235.6, 264/235.8, 289.3, 289.6; 427/171, 172, 173; 428/423.7, 484; 260/28 R

[56] References Cited

U.S. PATENT DOCUMENTS

| | | | |
|---|---|---|---|
| 3,619,267 | 11/1971 | Weissermel | 260/28 |
| 3,872,040 | 3/1975 | Mollohan et al. | 260/28 |
| 3,963,820 | 6/1976 | Blakey | 264/134 |
| 4,000,117 | 12/1976 | Shah | 260/28 R |
| 4,093,458 | 6/1978 | McGrail et al. | 427/173 |
| 4,132,552 | 1/1979 | Paesschen et al. | 428/484 |
| 4,233,352 | 11/1980 | Ono | 428/484 |
| 4,293,508 | 10/1981 | Heirbaut et al. | 264/134 |
| 4,301,053 | 11/1981 | Wolfrey | 428/423.7 |
| 4,307,219 | 12/1981 | Larson | 428/423.7 |

FOREIGN PATENT DOCUMENTS

| | | | |
|---|---|---|---|
| 51-31276 | 9/1976 | Japan | 264/134 |
| 55-15825 | 2/1980 | Japan | 428/423.7 |

Primary Examiner—James B. Lowe
Attorney, Agent, or Firm—Wenderoth, Lind & Ponack

[57] ABSTRACT

A process for producing an easily adherable biaxially stretched polyester film, which comprises coating a primer composition consisting of (A) and aqueous dispersion of polyurethane and (B) a montan wax salt and optionally a nonionic or anionic surface-active agent on the surface of a polyester film which has not yet been stretched completely, drying the coating, completing the stretching of the coated film, and then heat-setting it thereby to form a primer coated layer on the film surface.

4 Claims, No Drawings

PROCESS FOR PRODUCING EASILY ADHERABLE POLYESTER FILM

This invention relates to an easily adherable polyester film. More specifically, this invention relates to an easily adherable polyester film which is free from various troubles during coating or unwinding and also from blocking during storage.

It is known to form a film by melt-extruding a polyester prepared by polymerizing an aromatic dibasic acid or its ester-forming derivative and a diol or its ester-forming derivative, such as polyethylene terephthalate or its copolymers, a polyalkylene naphthalate, or a blend of this polymer with a minor proportion of another resin. A biaxially oriented heat-set polyester film is superior to films of other resins in heat resistance, gas-barrier property, electrical properties and chemical resistance, but has the defect that its surface has poor receptivity to paints, adhesives and inks because the surface is highly crystallized and oriented and has high cohesiveness.

Accordingly, in providing a synthetic resin layer on the surface of a polyester film, it is common practice to activate its surface in advance by corona discharge treatment, ultraviolet irradiating treatment, plasma treatment or flame treatment. [Journal of the Adhesion Society of Japan, Vol. 15, No. 12, pages 581–588 (1979)]. These surface activating means, however, are not entirely satisfactory because the adhesion strength obtained thereby is not on a satisfactory level, and the activity obtained decreases with time.

In order to increase receptivity of the surface of a polyester film substrate, an etching method was proposed in which the surface is swollen or partially dissolved with various chemicals. The gist of this method is that the surface of the film is etched with a chemical such as an acid, an alkali, an aqueous solution of an amine, trichloroacetic acid or a phenol to break down, dissolve or relax the crystalline orientation of the film near the surface and simultaneously decrease the cohesiveness of the surface, whereby the adhesion of the polyester film to binder resins is increased. This effect is most certain, and the adhesion between the substrate and a synthetic resin coated layer on it becomes firm. Since some of the chemicals used in this method are dangerous in handling or are likely to release hazardous vapors into the atmosphere, they should be carefully handled so as to avoid pollution of the working environment. Furthermore, the apparatus may undergo corrosion during coating and impregnation of these chemicals. Another disadvantage is that the treating chemicals remain in the treated substrate film, and exude with the lapse of time to adversely affect the upper coated layer.

As a means similar to this method, there was proposed a process which comprises forming on the surface of a substrate a primer coated layer different in kind from the substrate, and then coating the desired synthetic resin layer on it (Japanese Patent Publication No. 26580/1979) The formation of the primer coated layer is carried out in a separate step from the film-forming process, and the film is likely to gather dirt, dust, foreign matter, etc. during the treating step. Meticulously processed films which must maintain a high level of quality, such as audio and video magnetic tapes, magnetic tapes for computers, radiographic films, photographic films for printing, and diazo microfilms, will be useless if they gather such dirt and dust during the step of providing a good adhesive surface. In any case, it is disadvantageous both economically and technologically to provide a step of primer coating in the process of finishing a base film into the desired product.

It is desired therefore to perform in-line primer coating in the process of forming a polyester film which is carried out in an atmosphere substantially free from dust and dirt. In the prior art, the primer treatment for providing an easily adherable surface layer on a polyester film is carried out in many cases by coating the surface of the film with a composition dissolved in an organic solvent. When this technique is performed during the film formation, the organic solvent which dissipates may pollute the environment and bring about a situation which is undesirable both in regard to safety and santitation. This also adversely affects the film-forming process. The use of organic solvents, therefore, should be minimized, and in the in-line primer coating treatment in the film-forming process, the use of a composition dissolved in water as a solvent is preferred economically and in view of the process steps and safety.

Many primer compositions containing water as a solvent have been known. In the in-line primer coating treatment, however, they are very effective only for limited top coating compositions, and no primer composition has been developed which imparts surface receptivity satisfactory with respect to a wide range of top coating compositions.

When the in-line primer coating treatment is carried out in the film-forming process using resin emulsions or primers of the ethyleneimine-type, amine-type or epoxy-type which have been well known heretofore, the formation of a primer film is insufficient. Consequently, blocking occurs to reduce handlability, and many troubles in the properties and appearance of the film, such as stretching unevenness, coloration or discoloration are caused.

In view of the fact that the function of polyester films is considered as important in the field of high-grade and high-performance products, it is very significant to modity the surface of a polyester film to make it convenient for use in the production of film products without impairing its excellent properties, such as mechanical strength, thermal stability, transparency and chemical resistance.

Previously, the present inventors found that a polyester film having a fairly satisfactory easily-adherable surface can be obtained by coating a specified aqueous dispersion of polyurethane and a nonionic or anionic surface-active agent on a polyester film before it has been crystallized and oriented, and thereafter stretching the coated film (Japanese Laid-Open Patent Publication No. 15825/1980). The polyester film treated by the method of Japanese Laid-Open Patent Publication No. 15825/1980 has fairly satisfactory adhesion to cellophane ink, magnetic coating agents, gelatin compositions, offset inks, electrophotographic toner compositions, chemical mat paints, diazo paints, heat-sealability imparting compositions, inorganic film-forming substances, and metal evaporant materials. During the process of forming the aforesaid easily adherable coated polyester film, the primer coated layer should be heat-treated at a temperature of at least 180° C. for at least 4 seconds, and heating under milder conditions does not sufficiently induce formation of the primer coated layer, and the polyester film may sometimes have insufficient adhesion to the primer coated layer.

Furthermore, since the surface of the easily adherable film obtained by the process of Japanese Laid-Open Patent Publication No. 15825/1980 has high chemical activity, when it is wound up in roll form and stored, the film surface and the treated surface adhere to each other by the influences of temperature, humidity, pressure, etc. and at the time of unwinding, various troubles are caused by static charge buildup. Static buildup at the time of unwinding not only gives a shock to the human body as a result of discharging, but also generates coating unevenness during the coating step and may cause exposition and fire by spark discharge. When the surface of the film is very adhesive, the film adheres to itself to cause a so-called blocking phenomenon. This not only reduces handlability, but also breaks the film.

It is a primary object of this invention therefore to provide an easily adherable polyethylene terephthalate film free from the aforesaid defects.

The present inventors, in order to achieve the above object, extensively investigated from various angles into a method which can provide an easily adherable surface and a sufficient adhesion strength between a polyester film and a primer layer and inhibit the adhesion of the film surface to the treated surface, under all conditions in the process of producing a biaxially oriented polyester film. These investigations have led to the present invention.

According to this invention, there is provided a process for producing an easily adherable biaxially stretched polyester film, which comprises coating a primer composition consisting of (A) an aqueous dispersion of polyurethane and (B) a montan wax salt and optionally a nonionic or anionic surface-active agent on the surface of a polyester film which has not yet been stretched completely, drying the coating, completing the stretching of the coated film, and then heat-setting it thereby to form a primer coated layer on the film surface.

The polyester, as referred to in this invention, is a linear saturated polyester prepared from an aromatic dibasic acid or its ester-forming derivative and a diol or its ester-forming derivative. Examples of the polyester are polymers such as polyethylene terephthalate, polyethylene isophthalate, polybutylene terephthalate and polyethylene-2,6-naphtahalate, copolymers composed of the monomers constituting these polymers and blends of these polymers or copolymers with a minor proportion of other resins. The polyester film, as referred to in this invention, is obtained by melt-extruding the linear saturated polyester resin, formed into a film form in a customary manner, and then crystallized by orientation and heat-treatment. This polyester film is crystallized and oriented to such a degree that its crystal melting heat measured in a nitrogen stream by a scanning calorimeter at a temperature raising rate of 10° C./min. is usually at least 4 cal/g.

The polyester film which exists before the completion of crystallization and orientation in this invention includes an unstretched cast film obtained by melting the polymer and forming it into a film; a monoaxially stretched film obtained by orienting the unstretched film either longitudnally or transversely; and an incompletely biaxially oriented film which has been stretched longitudinally and/or transversely only at low stretch ratios and has not yet been finally stretched logitudinally and transversely. If the primer coating treatment is applied to a film which has been biaxially stretched and heat-set to complete crystallization and orientation, the adhesion between the primer coated layer and the base film does not become sufficient.

Before the orientation and crystallization of the film structure are completed, the aqueous dispersion of polyurethane (A) is coated on the surface of the film, and the coated film layer forms a primer layer adhering closely to the surface of the substrate film by going through the steps of stretching and heat-treating the substrate film. Desirably, the primer coated layer has good adhesion to various top coatings to be used in the subsequent processing step.

The aqueous dispersion of polyurethane (A) which can be used in this invention is an aqueous dispersion of polyurethane not containing an emulsifier, which is obtained by reacting (i) a dihydroxy compound having a molecular weight of 750 to 3,000,
(ii) a polyisocyanate compound,
(iii) a water-soluble salt of an aliphatic sulfonic acid or an aliphatic aminocarboxylic acid having at least one hydrogen atom bonded to nitrogen, and
(iv) a compound containing two hydrogen atoms reactive with the isocyanate groups, having a molecular weight of not more than 300, and being free from a salt group, as a chain extender, as dissolved or dispersed in a water-containing organic solvent, and finally removing the organic solvent.

The polyurethane constituting the primer coated layer in accordance with this invention can be produced by known methods. This reaction is carried out in the presence or absence of an inert organic solvent. The reaction temperature is usually about 50° to about 100° C., and in the reaction, an organometallic compound (such as, stannous octylate and acetylacetonatoiron) or a tertiary amine (e.g., N-methylmorpholine) may be added. First, the dihydroxy compound (i) having a molecular weight of 750 to 3,000 is dissolved in an inert organic solvent, and reacted with the polyisocyanate compound (ii) at a temperature of not more than 100° C. The reaction product is then reacted with the chain extender (iv) free from a salt group to form a prepolymer having a terminal isocyanate group. Then, an aqueous solution of the aliphatic aminocarboxylic acid salt or aliphatic sulfonic acid salt (iii) is mixed, and water is further added. Finally, the low-boiling organic solvent is removed by steam distillation to obtain an aqueous dispersion (A) of polyurethane having a solids content of 30 to 50% by weight.

Examples of the dihydroxy compound (i) having a molecular weight of 750 to 3,000 include polyester diols, polyether diols, polythioether diols, polylactone diols and polyacetal diols. The polyester diols and polyether diols are preferred.

Typical examples of the polyester diols are linear polyesters having a hydroxyl group at both terminals, which are obtained by reacting diols such as ethylene glycol, propylene glycol, butylene glycol and diethylene glycol or mixtures thereof, with organic dicarboxylic acids, for example saturated aliphatic dicarboxylic acids (e.g. adipic acid or sebacic acid), unsaturated aliphatic dicarboxylic acids (e.g., maleic acid, or fumaric acid), aromatic dicarboxylic acids (e.g., isophthalic or phthalic acid) or the anhydrides or mixtures of these. There can be used polyesters obtained by ring-opening polymerization of lactones such as caprolactam or methylcaprolactone with diols.

If the molecular weight of the dihydroxy compound is lower than 750, the strength and abrasion resistance of the primer coated layer tend to be insufficient. If it is higher than 3,000, the aqueous dispersion has poor stability, and the adhesion of the primer coated layer to the base film tends to be insufficient.

Examples of the polyisocyanate compound (ii) include 1,4-tetramethylene diisocyanate, 1,6-hexamethylene diisocyanate, 1,8-octamethylene diisocynate, 1,10-decamethylene diisocyanate, 1,4-cyclohexylene diisocyanate, toluene diisocyanate, 1,3-phenylene diisocyanate, 4,4'-methylenebis (cyclohexyl isocyanate), 4,4'-diphenylmethane diisocyanate, isophorone diisocyanate, triphenylmethane triisocyanate, and mixtures of these.

In order to obtain a stable dispersion (A) and a tough coated film, it is preferred to use an aromatic diisocyanate and then an aliphatic diisocyanate, or both of them simultaneously. Of course, it is not impossible to perform polymerization using an aromatic or aliphatic diisocyanate singly. The use of the aromatic diisocyanate alone, however, gives a polymer which tends to sediment. When the aliphatic diisocyanate alone is used, the resulting coated film becomes too soft. In order to balance the various properties, it is preferred that the mole ratio of the former to the latter should be within the range of from 1:1 to 6:1.

The water-soluble salt (iii) of an aliphatic aminocarboxylic acid or an aliphatic sulfonic acid includes, for example, an alkali salt of an unsaturated carboxylic acid to which ethylenediamine can add, preferably such as a sodium or potassium salt of methacrylic, crotonic or maleic acid. Preferably, the alkali salt is used in such an amount that 0.02 to 1% by weight of —COO group or $SO_3$ group will be contained in the resulting polyurethane.

In order to improve the adhesion, flexibility, toughness, etc. of polyurethane, the compound (iv) having a molecular weight of not more than 300 and reactivity with the isocyanate groups and being free from a salt group is used as a chain extender. Examples of the chain extender (iv) include aliphatic diols such as ethylene glycol, diethylene glycol, 1,2- and 1,3-propylene glycols, 1,2-, 1,3-, and 1,4-butylene glycol, 2,2-dimethyl-1,3-propylene glycol, 1,6-hexanediol, 2,2,4-trimethyl-1,3-pentanediol, 2,2,4,4-tetramethylcyclobutanediol, 1,3-cyclopentanediol, 1,4-cyclohexanediol and 1,4-methylenebis(cyclohexanol); aromatic diols such as 1,4-phenylenebis($\beta$-hydroxyethyl ether), 1,4-phenylenebis($\beta$-hydroxyethyl ether), and isopropylidenebis-($\beta$-hydroxyethyl phenyl ether); and amino compounds such as ethylenediamine, hexamethylenediamine, diethylenetriamine, hydrazine, piperazine and diaminodiphenylmethane.

In preparing the polyurethane aqueous dispersion (A), it is recommended to select the reactants such that the ratio of the number of isocyanate groups to that of all active hydrogens which can react with the isocyanate groups is generally from 0.90 to 1.10, i.e. nearly equimolar.

In order that the resulting polyurethane may exhibit its good properties, the reactant ratio, i.e. the dihydroxy compound (i)/the isocyanate compound (ii)/the compound (iii) containing a salt group + the chain extender (iv), is from 1/4/3 to 1/10/9.

Examples of the polyurethane aqueous dispersion (A) are those available under the tradenames HYDRAN W-140, VONDIC 1150 and 1150NS of Japan Reichhold Co., Ltd., IMPRANIL DLN and DLH of Bayer AG, and DESMOCOLL KA-8100 and 8066 of Sumitomo Bayer Co., Ltd.

The montan wax salt (B) to be mixed with the aqueous polyurethane dispersion (A) denotes a metal salt of montan acid containing aliphatic monocarboxylic acids having 26 to 32 carbon atoms as main ingredients. Suitable montan wax salts (B) contain at least one metal of Groups I to III of the periodic table, such as lithium, sodium, potassium, barium, magnesium, calcium or aluminum, as a cation. The montan wax salt (B) is produced by reacting montan acid with 0.2 to 1.0 equivalent weight of a hydroxide or oxide of the above metal. Sodium montanate produced by the reaction of montan acid with an aqueous solution of sodium hydroxide is especially effective.

The montan wax salt (B) embraces a mixture of a montan acid ester and a montan acid metal salt, which is obtained by partially esterifying montan acid with not more than 0.9 equivalent, particularly 0.5 to 0.8 equivalent, of a dihydric alcohol having 2 to 4 carbon atoms in the alkylene group, and thereafter neutralizing the product with the aforesaid metal oxide or hydroxide. Examples of the diol used in esterification are ethylene glycol, 1,2- or 1,3-propanediol, and 1,3- or 1,4-butanediol.

The montan wax salt (B) may be in the form of an aqueous dispersion prepared by using an emulsifier, etc., or in the form of a fine powder.

The aqueous polyurethane dispersion (A) is mixed with the montan wax salt (B) to form a primer coating composition. The weight ratio of the polyurethane to the montan wax salt is from 90:10 to 99.99:0.01, preferably from 95:5 to 99.9:0.1. If this ratio is lower than 90:10, namely if the proportion of the montan wax salt (B) is too high, the adhesion between the primer coated layer and the substrate film and the adhesion between the primer coated layer and a top coated layer thereon are reduced. Furthermore, if the ratio is more than 99.99:0.01, namely if the proportion of the montan wax salt (B) is too low, the effect of the montan wax salt to prevent tackiness of the montan wax salt and impart slippage is reduced. The mixing of the two components may be effected by adding an aqueous dispersion of the montan wax salt (B) to the aqueous solution of polyurethane (A) and stirring the mixture; or by adding a powder of the montan wax salt (B) to the aqueous polyurethane dispersion (A) optionally together with an emulsifier and stirring the mixture.

Prior to coating the primer composition consisting of the aqueous polyurethane dispersion (A) and the montan wax salt (B) on the surface of a polyester film which is in the process of being oriented and crystallized, the film surface may be subjected to an electrical discharge treatment in advance as an auxiliary means of rendering the coating operation smooth. Instead of employing such an auxiliary means, there may be used a primer composition obtained by adding preferably not more than 15 parts by weight, per 100 parts by weight of polyurethane, of a surface-active agent to the mixture of the aqueous polyurethane dispersion (A) and the montan wax salt (B). Effective surface-active agents are those which promote wetting of a polyester film by decreasing the surface tension of the primer composition to below 40 dynes/cm. Many known surface-active agents can be used which are not chemically reactive with the polyurethane. Examples of the surfactants include polyoxyethylene alkyl phenyl ethers, polyoxyethylene fatty acid esters, sorbitan fatty acid esters, glycerin fatty acid esters, fatty acid metal soaps, alkylsulfates, alkylsulfonates, alkylsulfosuccinates, quaternary ammonium chloride, and alkylamine hydrochlorides.

In coating the primer composition composed of the aqueous polyurethane dispersion and the montan wax salt and optionally a surfactant on a polyester film which has not yet been completely oriented and crystallized, the suitable solids concentration of the primer composition is usually not more than 20% by weights, preferably not more than 15% by weight. The amount of the primer composition coated may be that required to cover the surface of the polyester film completely with the coated film. There is no need to coat it excessively. It is sufficient to form a coated film layer which is generally considered to be a primer layer in the art.

It is essential in the process of this invention to form a primer coated layer before the crystallization and orientation of the polyester film are completed. Application of the primer composition to a film which has been biaxially oriented and heat-set is scarcely effective. No clear reason can be assigned to it, but it may be theorized as follows: A very small amount of the montan wax salt exhibits an effect of markedly increasing the speed of crystallization of a polyester. This effect is not at all observed with other paraffin waxes and their salts. In the course of stretching, heat-treatment, etc. of the polyester film to which the primer composition containing the montan wax salt having such a property has been coated, the montan wax salt contacts the polyester film, and through a complex crystallization step, a strong adhesion will be generated between the polyester film and the primer coated layer.

Presumably, the montan wax salt also contributes to the antiblocking property of the easily adherable polyester film of the invention during storage. The montan wax salt is present in the finely dispersed or dissolved state in the primer coated layer, and when the easily adherable polyester film undergoes heating and humidification, the montan wax salt precipitates on the surface of the primer coated layer, and thus prevents sticking of the film.

The primer composition of this invention may contain other resins and other functional materials so long as its effect is not lost. In order to perform rapid drying and increase solubility, alcohol, ester and ether solvents may be added in amounts which do not markedly pollute the environment in the film-making process.

Any known coating methods can be used to coat the polyurethane on the surface of a polyester film before stretching-orientation. For example, there can be used roll coating, gravure coating, roll brush coating, spray coating, air knife coating, dip coating, and curtain coating either singly or in combination.

Usually, the primer composition is applied to the surface of an unstretched film which has just been cast from a molten polymer, or a monoaxially stretched film which has just been stretched longitudinally or transversely. In order to form the desired primer coated layer, it is preferred to dry the coated primer composition and then heat it for at least 2 seconds at a temperature of at least 120° C., immediately before the film is heat-set. It is also possible to coat the primer composition on the unstretched film or the monoaxially stretched film out of the film-forming line and subsequently biaxially or monoaxially stretching the coated film and then heat-set it within the film-forming line. From the standpoint of the treating time and economy, it is preferred to perform all of the steps within the film-forming line.

The easily adherable film of this invention exhibits excellent adhesion to cellophane ink, magnetic coating agents, gelatin compositions, linseed oil-type offset ink, electrophotographic toner compositions, chemical matte paints, diazo paints, heat-sealability imparting compositions, inorganic film-forming substances and metal evaporant materials.

The following Examples illustrate the present invention more specifically. All parts in these examples are by weight, and the various properties given therein were measured by the following methods.

1. Adhesion

A top coating composition was coated under predetermined conditions on a primer coated layer applied to the surface of a polyester film. A Scotch tape (MMM Co., Ltd.), 19.4 mm in width and 8 cm in length, was adhered to the coated layer with care being taken not to include air bubbles. A manually operable load roll described in JIS C2701 (1975) was rolled over the tape to level it. Then, the adhered portion measuring 5 cm in length was peeled off in T-shape with the tape side downward at a head speed of 300 mm/min. using Tensilon UM-III made by Toyo-Baldwin Co., Ltd., and the peel strength was measured. The peel strength was devided by the width of the tape and the quotient is defined as adhesion (g/cm).

2. Surface Slippage

The coefficient of friction between that surface of a polyester film to which the primer coated layer was formed and that surface which did not have the primer coated layer was measured at a temperature of 20° C. and a relative humidity of 60% by using a slippage measuring tester of Toyo Tester Co., Ltd.

3. Antiblocking Property

Two polyester films (15 cm × 10 cm) each having a primer coated layer formed on one surface were superimposed so that the primer-coated surface contacted the uncoated surface. A pressure of 2 kg/cm was applied to the superimposed assembly for 24 hours in an atmospher kept at 60° C. and 75% RH. In accordance with ASTM-D1893, two fully smoothened chrome plated rods having a diameter of 5 mm were interposed between the two films, and the two films were stripped off at a speed of 100 mm/min. The stripping force at this time was measured (if this value exceeds 100 g/10 cm, troubles occur in the processing of the film at an increased frequency).

4. Haze

The total transmittance (T) and the diffusion transmittance (Td) of the film sample were measured by using an integral spherical light transmittance measuring device (NDH-2, made by Nippon Senshoku Kogei Kabushiki Kaisha). The haze value is calculated as follows:

$$Haze = Td/T \times 100$$

The various top coating compositions used in evaluating adhesion were prepared by the following methods.

PREPARATION OF TOP COATING COMPOSITIONS

(1) Magnetic Paint

Nitrocellulose RS-½" (flakes containing 25% of isopropanol; a product of Dicell Co., Ltd.) was dissolved in a concentration of 40% by weight in a lacquer thinner. Then 439 parts of the resulting solution, 325 parts of a polyester resin (Desmophen #1700, a product of Bayer AG), 200 g of magnetic chromium dioxide powder, 1 part of soybean fatty acid (Lecion P, a product of Riken Vitamin Co., Ltd.) as a dispersant or wetting agent, 0.5 part of a cationic surfactant (Cation AB, a product of Nippon Oils and Fats Co., Ltd.) and 0.8 part of squalene (in shark liver oil) were put in a ball mill, and 2.82 parts of a mixture of methyl ethyl ketone (MEK for short), cyclohexanone and toluene in a weight ratio of 3:4:3 was further added. They were milled to prepare a matrix paint (45% by weight). To 50 parts of the matrix paint was added a solution of 4.8 parts of an addition reaction product of trimethylolpropane and tolylene diisocyanate (CORONATE L, a product of Nippon Polyurethane Kogyo Co., Ltd.; solids content 75% by weight) in 6.25 parts of n-butyl acetate to obtain a magnetic paint having a solids content of 42.75% by weight.

(2) Gravure Printing Ink

Two parts of a commercially available cellophane printing ink containing nitrocellulose and rosin-type resin as main binders (CLS-709; a product of Dainippon Ink and Chemicals Co., Ltd.) was diluted with 1 part of a mixed solvent consisting of toluene, ethyl acetate and methyl ethyl ketone in a ratio of 1:1:1 to form a paint.

(3) Gelatin Coating Composition

Ten parts of gelatin for photography (Nitta gelatin), 1 part of saponin and 539 parts of distilled water were mixed to prepare a gelatin coating composition having a solids content of 2%.

Each of the three paints described above was coated in the following manner on the primer coated layer of the polyester film which has been biaxially oriented and crystallized.

The magnetic paint (1) is roll-coated so that a coating having a thickness of 5 microns on an average will be obtained when the coating is dried at 80° C. for 1 minute and then aged at 60° C. for 24 hours.

The gravure printing ink (2) is gravure-coated so that a coating having a thickness of 1.2 microns on an average will be obtained when the coating is dried at 80° C. for 1.4 minutes.

The gelatin coating composition (3) is roll-coated so that a coating having a thickness of 0.6 micron on an average will be obtained when the coating is dried at 110° C. for 2 minutes.

The adhesions of these top coating paints were measured, and the results are shown in Table 1.

TABLE 1

| Paints | Substrate Biaxially oriented polyester film after completion of crystallization and orientation |
|---|---|
| Magnetic paint | 3.3 (g/cm) |
| Cellophane ink | 4.1 (g/cm) |
| Gelatin coating | 1.0 (g/cm) |

EXAMPLE 1

(a) Preparation of an Aqueous Polyurethane Dispersion

203 Parts of a commercially available polyester (Desmophen, a product of Bayer AG) having an OH value of 55 and derived from adipic acid, hexanediol and neopentyl glycol was stirred in a glass vessel, and at 20 mmHg, it was dehydrated for 30 minutes. After cooling, 200 parts of acetone was added. The solution was then fully mixed with butanediol-1,4.

Then, 69.7 parts of tolylene diisocyanate (isomer ratio 24/26=80/20), 33.6 parts of hexamethylene diisocyanate and 0.02 part of dibutyltin laurate were added, and they were stirred at 60° C. for 3 hours. The mixture was diluted with 300 parts of acetone, and gradually cooled to room temperature. Into the resulting product was introduced 193 parts of a 40% by weight aqueous solution of an equimolar adduct of sodium acrylate and ethylenediamine, and the mixture was further stirred well. Thirty-two minutes later, 709 parts of water was added dropwise, and subsequently, under reduced pressure, acetone was distilled off by steam distillation. Finally, a white dispersion having a polymer solid concentration of 47% was obtained.

(b) Preparation of a Primer Composition

180 Parts of the aqueous polyurethane dispersion obtained in (a) above, 5.5 parts of sodium montanate (m.p. 178° C.) and 10 parts of polyoxyethylene nonyl phenyl ether (a nonionic surfactant, HLB 12.3) were mixed, and treated for 30 minutes by a high-speed mixer. To the resulting dispersion was added 1.660 parts of deionized water was added to prepare a primer composition having a solids content of 5.4% by weight.

(c) Preparation of an Easily Adherable Film

Polyethylene terephthalate having an intrinsic viscosity, measured in o-chlorophenol at 25° C., of 0.65 was melt-extruded into a film having a thickness of 152 microns on a rotating drum kept at about 20° C., and stretched to 3.5 times in the machine direction on a metallic roll heated at 93° C. The primer coating composition prepared in (b) above was coated on one surface of the film by a kiss coating technique so that the average amount content of solids coated was 100 mg/m². The coated film was dried by passing it through a preheating zone at 98° C., and stretched transversely to 3.9 times at 105° C. Subsequently, the stretched film was heat-treated at 200° C. for 4.2 seconds to give an easily adherable polyester film having a primer coated layer with a thickness of 121 microns. The adhesion of the primer coated layer and the surface slippage, antiblocking property and haze of the film were measured. The results are shown in Table 2.

Comparative Example 1

An easily adherable polyester film having a primer coated layer was produced in the same way as in Example 1 except that a primer composition having a solids content of 5.4% obtained by diluting 223 parts of the aqueous polyurethane dispersion obtained in (a) of Example 1 and 10.4 parts of polyoxyethylene nonyl phenyl ether (HLB 12.3) with 1900 parts of deionized water was used instead of the primer composition prepared in (b) of Example 1.

The adhesion of the primer coated layer and the surface slippage, antiblocking property and haze of the resulting film were measured. The results are shown in Table 2.

It is seen from Table 1 that the film of Comparative Example 1 has an antiblocking property exceeding 100 g/10 cm which is the critical limit leading to processing troubles, but the film of Example 1 has a lower antiblocking value (0.5 g/10 cm) and thus has excellent processability.

TABLE 2

| Items of evaluation | | Film | |
|---|---|---|---|
| | | Example 1 | Comparative Example 1 |
| Adhesion (g/cm) | (1) Magnetic paint | 158 | 145 |
| | (2) Gravure ink | >300 | >300 |
| | (3) Gelatin coating composition | >300 | >300 |
| Surface slippage | Coefficient of static friction | 0.34 | 0.48 |
| | Coefficient of dynamic friction | 0.33 | 0.46 |
| Antiblocking property (g/10 cm) | | 0.5 | 150 |
| Haze (%) | | 3.4 | 3.5 |

EXAMPLE 2

194 Parts of the aqueous polyurethane dispersion obtained in (a) of Example 1, 0.8 part of sodium montanate (m.p. 172° C.) and 8.2 parts of Penerol NP-9 (a nonionic surfactant made by Matsumoto Yushi Seiyaku Kabushiki Kaisha) were mixed, and treated for 15 minutes in a homogenizer. Then, 9800 parts of deionized water was added to give a primer composition having a solids content of 1.0%. The primer composition was coated in the same way as in Example 1 on one surface of an unstretched film having a thickness of 152 microns immediately after melt-extrusion. It was dried and biaxially stretched and heat-set under the same conditions as in Example 1 to give an easily adherable polyester film having a primer coated layer. The adhesion of the primer coated layer, and the surface slippage, antiblocking property and haze of the film were measured. The results are shown in Table 3.

EXAMPLES 3 AND 4

In the same way as in Example 2, the same primer composition as used in Example 2 was coated on an unstretched cast polyester film, and dried. The film was then longitudinally stretched to 3.5 times at 93° C. and then transversely to 3.9 times at 105° C. Thereafter, the stretched film was heat-treated at 200° C. for 2.4 seconds (Example 3) or for 3.0 seconds at 178° C. (Example 4). The properties of the resulting easily adherable films are shown in Table 3.

Comparative Example 2

A polyester film having a primer coated layer was produced in the same way as in Example 3 by using the same primer composition as used in Comparative Example 1 but diluted to a solids content of 1.0% by weight. The properties of the film were measured, and the results are shown in Table 3.

Comparative Example 3

A polyester film having a primer coated layer was produced in the same way as in Example 4 by using the same primer composition as used in Comparative Example 2. The properties of the film were measured, and the results are shown in Table 3.

TABLE 3

| | | Example 2 | Example 3 | Example 4 | Comparative Example 2 | Comparative Example 3 |
|---|---|---|---|---|---|---|
| Heat-treating conditions for the film | Temperature (°C.) | 200 | 200 | 178 | 200 | 178 |
| | Time (seconds) | 4.2 | 2.4 | 3.0 | 2.4 | 3.0 |
| Adhesion (g/cm) | (1) Magnetic paint | 105 | 99 | 95 | 49 | 58 |
| | (2) Gravure ink | >300 | >300 | >300 | 170 | 244 |
| | (3) Gelatin coating composition | >300 | >300 | >300 | 183 | 190 |
| Surface slippage | Coefficient of static friction | 0.33 | 0.41 | 0.37 | 0.49 | 0.51 |
| | Coefficient of dynamic friction | 0.36 | 0.42 | 0.35 | 0.48 | 0.49 |
| Antiblocking property (g/10 cm) | | 2 | 5 | 8 | 115 | 145 |
| Haze (%) | | 3.1 | 3.2 | 3.0 | 3.3 | 3.2 |

EXAMPLES 5 TO 10

Each of the commercially available polyurethane dispersions shown in Table 4 was mixed with sodium montanate in each of the ratios indicated, and a surface-active agent (Nonion NS 208.5; a product of Nippon Oils and Fats Co., Ltd.) and deionized water were added to the mixture to prepare a primer composition. The primer composition was coated on one surface of a polyester film in the same way as in Example 1 to form a primer coated layer. The properties of the resulting easily adherable polyester film were measured, and the results are shown in Table 4.

TABLE 4

|  |  | Example 5 | Example 6 | Example 7 | Example 8 | Example 9 | Example 10 |
|---|---|---|---|---|---|---|---|
| Commercially available aqueous polyurethane dispersion (manufacturer) | | Desmocoll KA-8100 (Sumitomo-Bayer) | Impranil DLH (Bayer AG) | Impranil DLN (Bayer AG) | Hydran W-140 (Japan Reichhold) | Vondic 1150 (Japan Reichhold) | UE-296 (Kao Soap Co., Ltd.) |
| Weight ratio of polyurethane to montan wax salt | | 98:2 | 99:1 | 92:8 | 90:10 | 99.8:0.2 | 95:5 |
| Solids concentration (%) | | 5 | 5 | 12 | 15 | 2 | 10 |
| Adhesion (g/cm) | (1) Magnetic paint | 182 | 175 | 201 | 210 | 144 | 193 |
| | (2) Gravure ink | >300 | >300 | >300 | >300 | >300 | >300 |
| | (3) Gelatin coating composition | >300 | >300 | >300 | >300 | >300 | >300 |
| Surface slippage | Coefficient of static friction | 0.41 | 0.39 | 0.52 | 0.52 | 0.32 | 0.49 |
| | Coefficient of dynamic friction | 0.43 | 0.41 | 0.50 | 0.53 | 0.31 | 0.47 |
| Antiblocking property (g/10 cm) | | 18 | 12 | 54 | 43 | 2 | 31 |
| Haze (%) | | 3.5 | 3.4 | 4.1 | 4.0 | 3.3 | 3.7 |

What we claim is:

1. A process for producing an easily adherable biaxially stretched polyester film, which comprises coating a primer composition consisting essentially of (A) an aqueous dispersion of polyurethane and (B) a montan wax salt on the surface of a polyester film which has not yet been stretched completely, drying the coating, completing the stretching of the coated film, and then heat-setting it to thereby form a primer coated layer on the film surface, said aqueous dispersion of polyurethane (A) being an aqueous dispersion of polyurethane free from an emulsifying agent, which is obtained by reacting (i) a dihydroxy compound having a molecular weight of 750 to 3,000, (ii) a polyisocyanate compound, (iii) a water-soluble salt of an aliphatic aminocarboxylic acid or an aliphatic sulfonic acid having at least one hydrogen atom bonded to nitrogen, and (iv) a compound having a molecular weight of not more than 300 and two hydrogen atoms reactive with the isocyanate groups and being free from a salt group as a chain extender in a solution or dispersion in a water-containing organic solvent, and finally removing the organic solvent portion.

2. The process of claim 1 wherein the primer composition further contains a nonionic or anionic surface active agent as an additional component.

3. The process of claim 1 wherein the primer composition consists of 90 to 99.99% by weight of the aqueous dispersion of polyurethane (A) and 10 to 0.01% by weight of the montan wax salt (B).

4. The process of claim 1 or 2 wherein the montan wax salt (B) is a salt of montan acid containing aliphatic monocarboxylic acids having 26 to 32 carbon atoms as main ingredients, with a metal of Groups I to III of the periodic table.

* * * * *